Oct. 17, 1939.  S. S. JOHNS  2,176,401

POWER TRANSMISSION MECHANISM

Filed Oct. 16, 1936  7 Sheets-Sheet 1

Inventor
Stanley S. Johns
By Wilkinson & Mawhinney,
Attorneys

Oct. 17, 1939.  S. S. JOHNS  2,176,401
POWER TRANSMISSION MECHANISM
Filed Oct. 16, 1936  7 Sheets-Sheet 2

Inventor
Stanley S. Johns
By Wilkinson & Mawhinney
Attorneys

Oct. 17, 1939.    S. S. JOHNS    2,176,401
POWER TRANSMISSION MECHANISM
Filed Oct. 16, 1936    7 Sheets-Sheet 4

Oct. 17, 1939.  S. S. JOHNS  2,176,401

POWER TRANSMISSION MECHANISM

Filed Oct. 16, 1936  7 Sheets-Sheet 7

Inventor
Stanley S. Johns
By Wilkinson & Mawhinney,
Attorneys

Patented Oct. 17, 1939

2,176,401

UNITED STATES PATENT OFFICE 2,176,401

POWER TRANSMISSION MECHANISM

Stanley S. Johns, Baltimore, Md.

Application October 16, 1936, Serial No. 106,031

9 Claims. (Cl. 60—53)

This invention relates to power transmission mechanism, and more particularly to that of the fluid type wherein motion is transmitted from one shaft to another through a fluid medium.

An object of the present invention is to increase the efficiency of mechanism of this character by reducing the volume of fluid movement during the most used speed range, and wherein a direction drive is accomplished without the variation in the circulation of the fluid medium.

Another object of the invention is to provide a simplified control of the fluid circulation to effect a relative change in speed between the drive and driven shafts and to effect a change in direction of the driven shaft relative to the drive shaft.

A further object of the invention is to provide means whereby the quantity of fluid in the system will be maintained at the proper operating quantity during the operation of the transmission.

The invention also aims to provide a relatively small and compact fluid transmission unit which may be readily substituted in drive lines without occupying excessive space, and wherein the parts are so constructed that heat generated by operation of the mechanism will be quickly dissipated, and the improved transmission mechanism may thus be adapted to various installations and uses.

A further feature of the invention is to provide a compact variable speed unit of the fluid type adapted for practically all installations, and particularly suited for automotive usage, wherein the improved transmission is adapted to replace the usual fly-wheel, clutch and gear transmission of standard practice.

With the foregoing and other objects in view, the invention will be more fully described hereinafter, and will be more particularly pointed out in the claims appended hereto.

In the drawings, wherein like symbols refer to like or corresponding parts throughout the several views.

Figures 1, 19:
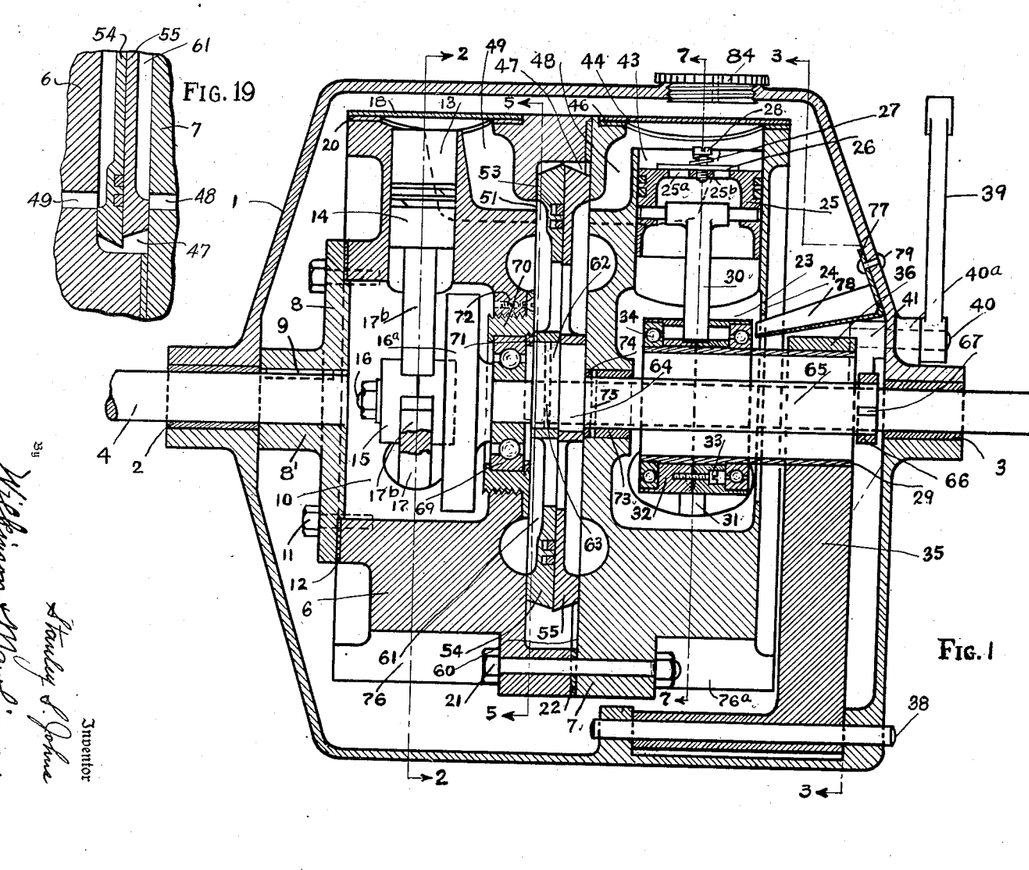
Figure 1 is a vertical longitudinal section taken axially through a fluid transmission mechanism embodying the features of this invention.
Fig. 19 is a fragmentary sectional view taken on the line 19—19 of Fig. 6.

Referring to the drawings, the numeral 4 designates a drive shaft which is adapted to be connected to a suitable source of power supply, and the numeral 5 designates a driven shaft which is disposed in axial alinement with the drive shaft 4. A casing or housing 1 is disposed about the abutting ends of the shafts 4 and 5 and is provided with a bearing 2 at one end thereof through which the shaft 4 is journalled, and a bearing 3 at the opposite end through which the shaft 5 is journalled.

A cylinder block 6 is disposed within the casing 1, the block 6 being of annular construction, and this block 6 is provided with an axial recess 10 opening through the forward side of the block, this recess 10 constituting a crankshaft chamber. A plate 8 sealed by gasket 12 is secured by means of bolts 11 or the like to the open side of the chamber 10 and is provided with an axial hub or boss 8' engaging about the drive shaft 4, the hub 8' being fastened to the shaft 4 as by a key 9 or the like.

The block 6 is provided with a plurality of radially arranged cylinders 13, and a piston 14 is slidable in each cylinder 13. A head or closure plate 18 engages over the outer end of each cylinder 13 and is secured as by bolts 19 or the like, and a gasket 20 is interposed between each plate 18 and the block 6.

Figure 2:
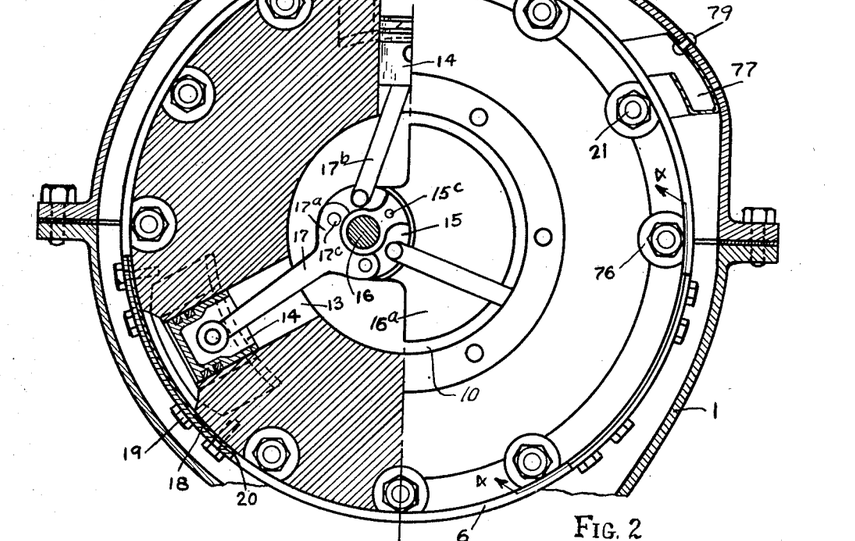
Figure 2 is a transverse section taken substantially on the line 2—2 of Fig. 1 with a portion of the mechanism shown in end elevation.
Figure 8:
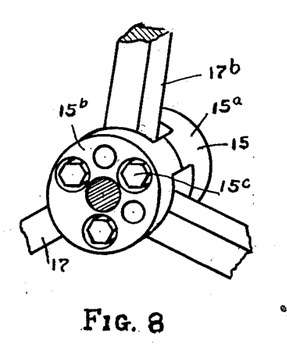
Figure 8 is a fragmentary perspective view of the mounting means for the driving piston connecting rods.

A crank member 16 is secured to a plate 16a which is fixed to the inner end of the driven shaft 5 and is disposed within the crank chamber 10. The crank member 16 is disposed in offset relation to the axis of the shaft 5, and a coupling member 15 is rotatable on the crank member 16. A connecting rod 17 is secured at one end to one of the pistons 14, and the opposite or inner end of the rod 17 is bifurcated as at 17a, with the forked or bifurcated end portion of the rod 17 secured as by pins 17c to the coupling member 15. This coupling member 15 is formed of two parts, 15a and 15b, as shown in Fig. 8, and these parts 15a and 15b are secured together by means of bolts 15c. The remaining pistons 14 are connected to the coupling member 15 by means of connecting rods 17b, as shown in Fig. 2.

The inner side of the block 6 is provided with an annular valve chamber 61 in which a pair of abutting valve members 54 and 55 are disposed. These valve members 54 and 55 are of annular construction and are substantially identical. A pair of sealing rings 56 and 57 are mounted in the inner side of the valve member 54, and these rings are tensioned by means of springs 59 and 58, respectively, so that they will yieldingly hold the valve members 54 and 55 against their respective annular seats. The valve member 54 bears against an annular seat 53 formed on the inner end of the valve chamber 61, and the valve member 55 bears against a valve seat 60 formed on the inner end of a second block 7 which is secured to the block 6 by means of bolts 21 or the like. A gasket 22 is interposed between the blocks 6 and 7.

Figure 9:
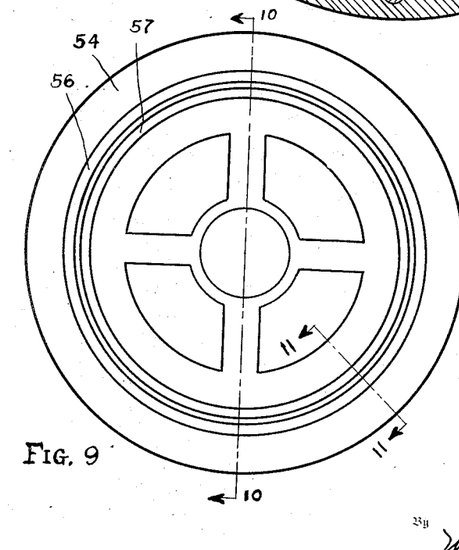
Figure 9 is a detail side elevation of one of the valve members.
Figures 10, 11:
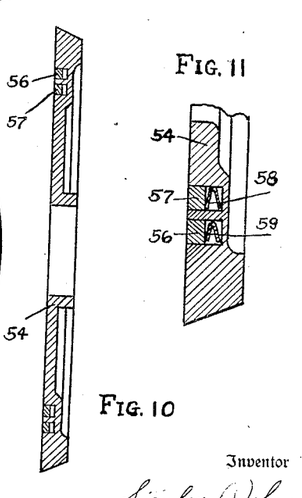
Figure 10 is a sectional view taken on the line 10—10 of Fig. 9.
Figure 11 is an enlarged sectional view of a portion of one of the valve members.

The valve member 54 is rotatably mounted on an eccentric 62 which is fixed to the driven shaft 5 by means of a pin 63 or like securing means so that the valve member 54 will move relative to ports 50, 51 and 52 which are provided in the block 6 and alternately open and close such ports. The ports 50, 51 and 52 communicate with a fluid passage 49 which in turn communicates with the outer end of each cylinder 13. There is a separate passage 49 for each cylinder 13 and one passage 49 for each port 50, 51 and 52. The valve members 54 and 55 are of spider construction, as shown in Fig. 9 so that the fluid may flow freely within the chamber 61, restricted only by the positions of the valve members 54 and 55.

The block 7 is provided with a plurality of radially arranged master or controlling cylinders 43 which are disposed in a position with cylinders 13 opposite cylinders 13. A piston 25 is slidable in each cylinder 43, and the pistons 25 are relatively larger in diameter than the pistons 14. The outer end of each cylinder 43 is closed by a plate or head 44 which is secured to the block 7 as by bolts 45 or the like, and a gasket 46 is interposed between the head 44 and the block 7. The block 7 is provided with a plurality of fluid passages 48, there being one passage 48 for each cylinder 43, and the passages 48 communicate at one end with the outer end of the cylinders 43 and at the opposite or inner end with the valve chamber 61.

The block 7 has a central oil chamber 23 opening through the rear side thereof, the rear end of the chamber 23 being defined by a flange 24 which serves the purpose of retaining a quantity of oil in the chamber 23 at all times. Connecting rods 30 are secured at their outer ends to the pistons 25 and at their inner ends to a split annulus 32, the annulus 32 being secured together by means of bolts 33 or the like. A stabilizing connecting rod 31 is secured at one end to one of the pistons 25 and the inner end of this rod 31 is forked, as at 31b with at least two pins 31a secured to the forked end 31b, so that the annulus 32 will not turn relative to the connecting rods 30 and 31.

The annulus 32 is rotatably mounted on a sleeve 29 which is disposed loosely about the driven shaft 5 and which extends outwardly through the opening defined by the flange 24. The outer or rear end of the sleeve 29 is fixedly secured in one leg of a bell crank lever 35 which is rockably mounted on a shaft 38 carried by the casing 1. Anti-friction bearings 34 are carried by each end of the annulus 32 and engage the sleeve 29 so that the annulus 32 may freely turn upon the sleeve 29. The upper end of the bell crank lever 35 is provided with spaced ears 36 which may be drawn together by means of a bolt 37 so that the sleeve 29 may be tightly and removably mounted in the upper end of the lever 35. This lever 35 with the sleeve 29 provides a speed selector means and a control means by which the movement of the master pistons 25 may be varied at will with respect to the pistons 14 and thus obtain the desired variation in the speed of the driven shaft 5 with respect to the drive shaft 4, this speed being either forward, reverse, or neutral, with the degree of forward or reverse speed being dependent only upon the offset position of the annulus 32 through the operation of the controlling lever 35.

A valve adjusting sleeve 65 is mounted loosely upon the driven shaft 5, having a bearing 73 in the inner end of the block 7. An eccentric 64 is secured to the inner end of the sleeve 65 and engages within the central portion of the adjustable valve member 55. A ring 74 is interposed between the bearing 73 and the eccentric 64, and an expanding ring 75, which is V-shape in transverse section, is interposed between the bearing 73 and the ring 74. The outer end of the sleeve 65 has a lever 66 secured thereto, as by a key 67, and a link 68 connects this lever 66 with the short lever arm 35a of the bell crank lever 35, so that the adjustment of the valve 55 will be synchronized with the adjustment of the lever 35 and the annulus 32.

A lever 41 is mounted on a shaft 40 carried by a boss or bearing 40a, and the lever 41 is connected to the upper or inner end of the lever 35 by means of a link 42. The shaft 40 extends outwardly through the rear end of the casing 1, and an operating lever 39 is secured to the projecting end of the shaft 40 so that rocking of the lever 39 will effect rocking of the lever 35 and adjustment of the annulus 32.

Each piston 25 is provided with an opening 25a through the top or head thereof, and a web or bar 25b extends across this opening 25a. An outwardly opening check valve 26 engages over the opening 25a and is tensioned by means of a spring 27 and an adjusting screw 28. This check valve is provided for the purpose of assuring an operative quantity of fluid in the passages 48 and 49 at all times.

Figure 5:
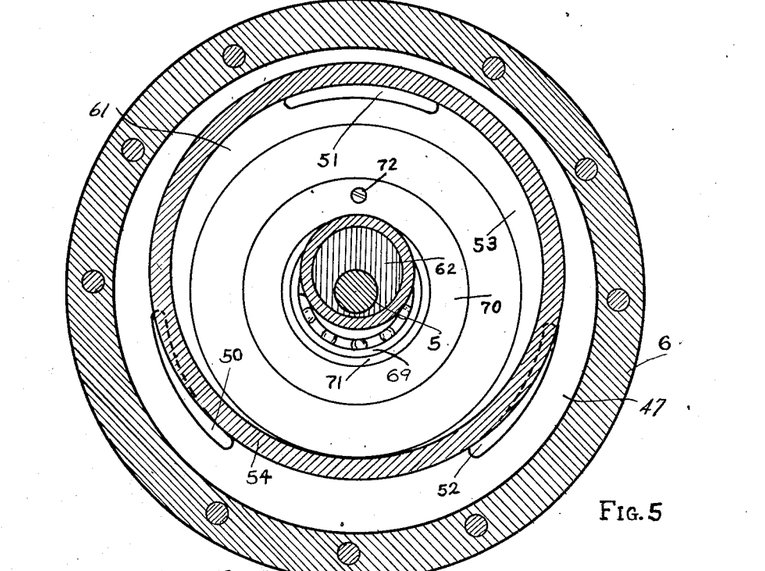
Figure 5 is a sectional view taken on the line 5—5 of Fig. 1.
Figure 6:
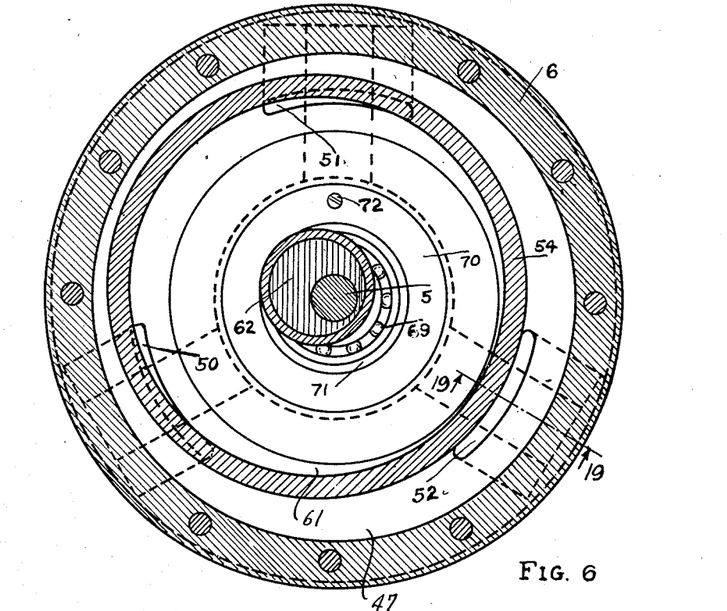
Figure 6 is a sectional view similar to Fig. 5 but showing the controlling valve in a different position.
Figure 7:
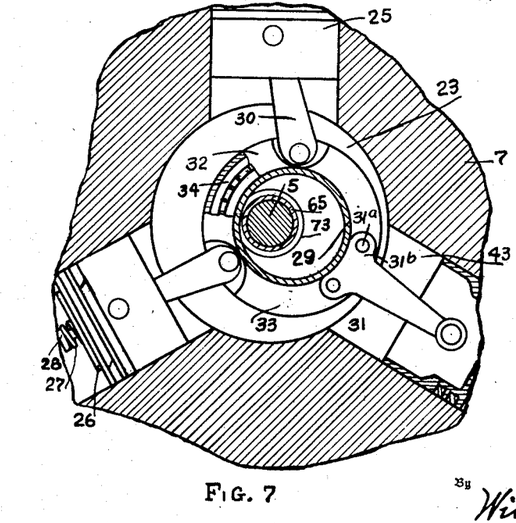
Figure 7 is a fragmentary sectional view taken on the line 7—7 of Fig. 1.

The fluid in the valve chamber 61 is permitted to enter into the closed crank chamber 10 through a ball race or anti-friction bearing 69 which is mounted in a sleeve 70 which is threaded into the inner end of the block 6. The sleeve 70 is provided with a flange to limit the movement of the bearing 69 which is held in by annulus 71 screwed into sleeve 70, and the inner end of the sleeve 70 is also provided with a flange having bolts or screws 72 disposed therethrough to prevent loosening thereof. A chamber 47 is provided on the periphery of the valve members 54 and 55 which is in communication with certain of the passages 50, 51 and 52 at times, as shown more clearly in Fig. 5. In this manner, where the pistons 25 are operating as pressure pistons or driving pistons, in the event the passage 48 of one or more of these pistons is in communication with the chamber 47, the fluid will flow through the passage 48 into the chamber 47, and then flow around this passage until it finds an opening into a passage 49. This movement is clear from a study of Fig. 5.

Figures 3, 14, 15:
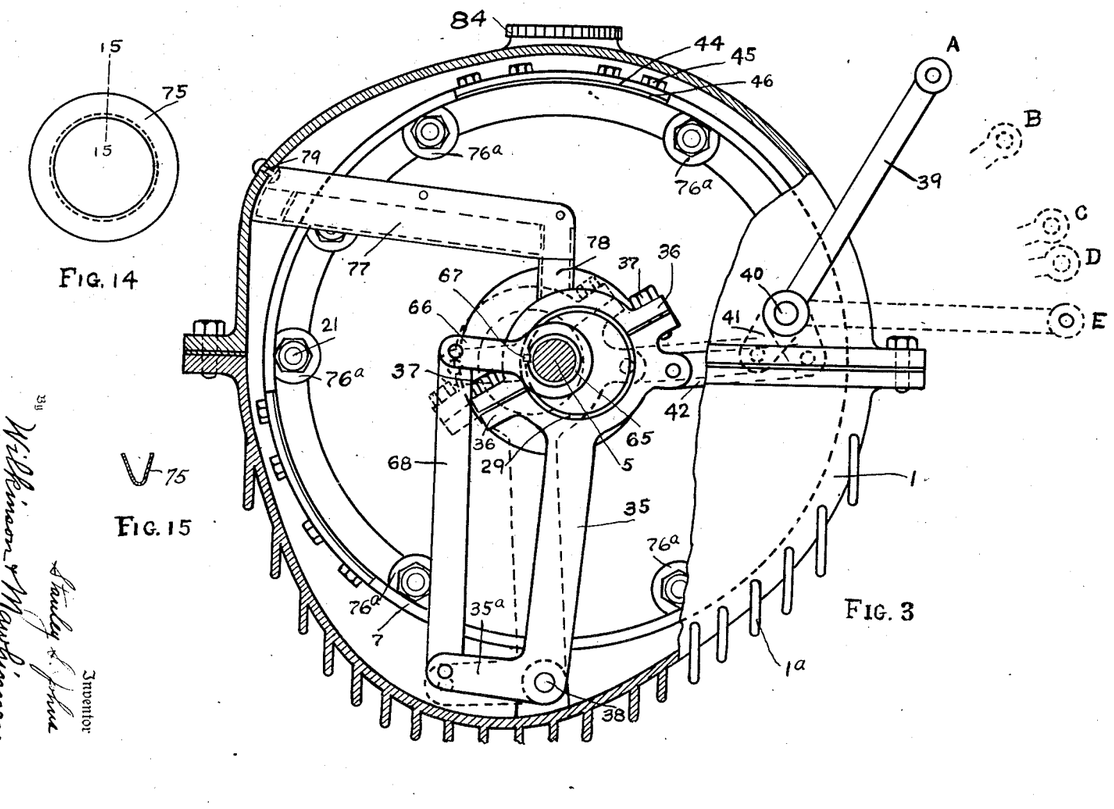
Figure 3 is a sectional view, partly in detail, taken substantially on the line 3—3 of Fig. 1.
Figure 14 is a detail side elevation of an expansible ring used in connection with the valve members.
Figure 15 is a sectional view taken on the line 15—15 of Fig. 14.
Figure 4:
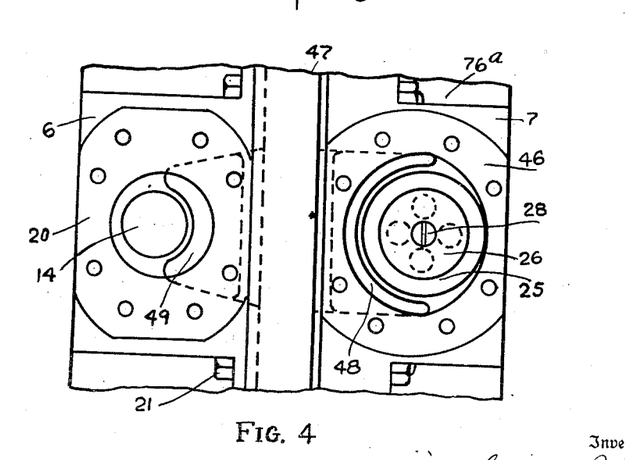
Figure 4 is a fragmentary side elevation taken on the line 4—4 of Fig. 2 showing the cylinder heads removed from the cylinders.

The blocks 6 and 7 are each provided with relatively large openings 76 and 76a, respectively, by means of which the bolts 21 may be applied or removed, and these openings 76 and 76a open through the periphery of the blocks 6 and 7 and constitute oil carrying channels for throwing the oil in the lower portion of the casing toward the top. A chute 78 is provided with a flange 77 which is fastened as by rivets 79 to the rear end and side of the casing 1, and this chute 78 constantly discharges oil from the casing 1 into the oil chamber 23, so that in the initial filling and in the event there is a depletion of oil or fluid in the operating passages 48 and 49, the valves 26 will open and oil will flow through the opening 26a of each piston 25. There is thereby assured an adequate supply of fluid in the passages 48 and 49 irrespective of whether the casing 1 is entirely full of fluid or only partially full. In practice it is not necessary that the casing 1 be entirely filled with fluid which is discharged into the casing through a filling opening having a removable plug 84. The casing 1 may be provided with a plurality of heat dissipating fins 1a, as shown in Fig. 3 so as to prevent undue heating of the operating fluid.

In the operation of this transmission, the drive shaft 4 is connected to a suitable source of power supply, and the driven shaft 5 connected to a suitable member or members to be operated from the drive shaft 4. The casing 1 is filled to the proper level with a fluid, preferably oil, which enters the various channels within the blocks 6 and 7 as described. The operating lever 39 is swung downwardly to the position indicated at D, which is the neutral position. In the neutral position D the annulus 32 is an eccentric or offset position with respect to the axis of the driven shaft 5 with the fluid displacement of the pistons 25 equal to the fluid displacements of the pistons 14. When the lever 39 is in the neutral position, the fluid will flow back and forth from the cylinders 13 to the cylinders 43 through the passages 49 and 48 and the valve chamber 61.

Assuming that forward speed is desired, the lever 39 is moved upwardly to position C, which is the low speed position and in this position the fluid displacement of the pistons 25 will be less than the displacement of the pistons 14 so that the pistons 14 will drive the shaft 5 forwardly. The forward speed may be increased by moving the lever 39 upwardly until the lever is in position B at which time the annulus 32 is concentric to the driven shaft 5 and the pistons 25 are substantially stationary in the cylinders 43, and as there is no displacement of fluid the shafts 4 and 5 will revolve at substantially the same speed. Further movement of lever 39 toward position A causes shaft 5 to revolve faster than shaft 4 due to the change in the direction of fluid flow, which occurs when annulus 32 passes center, thus driving the pistons 14 forward at a speed greater than that of the revolving blocks 6 and 7. It will be understood that when annulus 32 is off-center in one direction shaft 5 will revolve slower than shaft 4, and when offset in the opposite direction shaft 5 will revolve faster than shaft 4.

Figure 20:
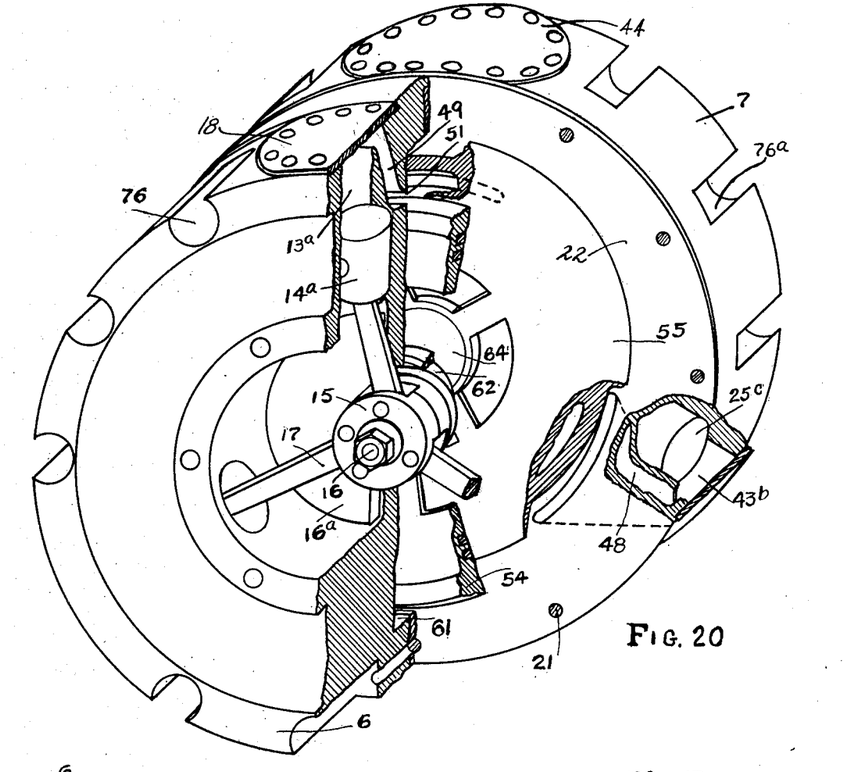
Figure 20 is a perspective view partly broken away and in section of the cylinder blocks showing the relation of the pistons of each block to each other and the positions of the valves.

In Figure 20, there is shown a perspective view, partly broken away, from which the operation of the two series of pistons and the valves may be more clearly understood. In this figure, the uppermost cylinders and pistons are designated 13a and 14a, respectively, in the driven series, and 43b and 25c in the driving series, respectively. Assuming that the driven piston 14a is moving outwardly, the fluid in the cylinder 13a will flow on the outer side of the valve member 54, and as the valve member 55 closes, the fluid passage 48 directly opposite the cylinder 13a, will move around until it finds an open passage which in this instance, is the passage 48 to the cylinder 43b which is the succeeding driving cylinder in a clockwise direction from the cylinder 13a. Due to the fact that the crank supporting and controlling lever 35 is mounted in such a manner that the inner end thereof swings on an arc the valve 55 must be adjusted simultaneously with the movement of the crank 35. This is due to the fact that eccentric 64 supporting valve 55 is offset at approximately a right angle to the throw of annulus 29 and for this reason the eccentric 64 must be rotated slightly on shaft 5 to maintain this angularity throughout the entire adjustment range of the annulus 29.

Where it is desired to reverse the driven shaft 5, the lever 39 is rocked downwardly to the position "E", in which position the annulus 32 is offset from the axis of the drive shaft 5 to such a position that the fluid displacement of the pistons 25 will be in excess of the fluid displacement of the pistons 14.

It is not necessary in the operation of this transmission that the cylinders 13 and 43, the fluid passages 48 and 49, and the valve chamber 61, be completely filled with a liquid. In other words, the pistons 25 operate as pumps and set up the desired pressures in the various pistons, fluid passages, and valve chamber, and in the event there is any air or gases in the cylinders and passages, this air or the gases will be compressed by the pumping action of the various pistons until sufficient pressure has been generated to operate the driven shaft in the desired manner with respect to the drive shaft 4. It will, therefore, be understood that while this transmission has been designed for use with a fluid, this fluid may be air, gas, or a liquid such as oil or the like.

Figures 12, 13:
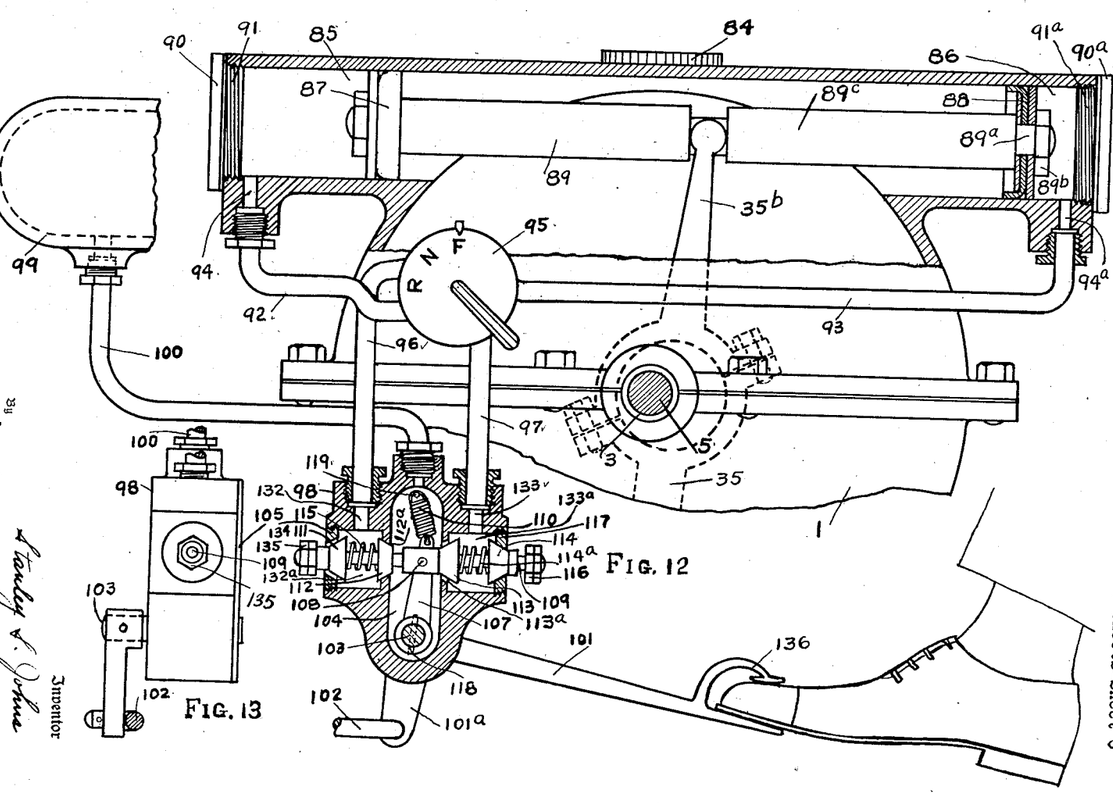
Figure 12 is a vertical section, partly broken away and partly in detail, of one form of controlling means for this transmission.
Figure 13 is a detail end elevation of the regulating valve used with the controlling means shown in Fig. 12.
Figures 16, 17:
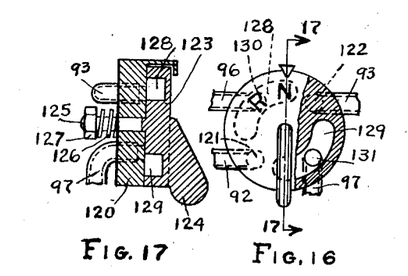
Figure 16 is a detail side elevation, partly in section, of the speed selector valve.
Figure 17 is a sectional view taken on the line 17—17 of Fig. 16.
Figure 18:
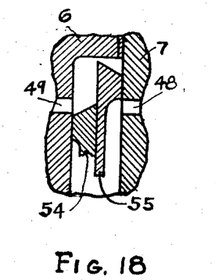
Figure 18 is a fragmentary sectional view showing the fluid controlling valves in one position with respect to the fluid passage.

The operating lever 35 may be actuated either manually or through a suction operating member, disclosed in Figures 12 and 13. This suction operating member comprises a pair of alined cylinders 85 and 86 having pistons 87 and 88, respectively, slidable therein. The pistons 87 and 88 are connected together through a rod 89a, and a pair of sleeves 89 and 89c engage about the rod 89a between the pistons 87 and 88, with the inner ends of the sleeves 89 and 89c spaced apart and engaging on opposite sides of the rod 35b connected to 35. If desired, the sleeves 89 and 89c may be made integral with the rod 89a and a suitable annular groove provided to receive the end of the rod 35b. Nuts 89b hold the heads or pistons 87 and 88 fast upon the rod 89a.

The cylinder 85 is provided with a head 90 which is threaded as at 91 into the end of the cylinder, and in like manner, the cylinder 86 is provided with a head 90a which is threaded as at 91a into the end of this cylinder 86. The cylinder 85 is provided with a port 94 at the outer end thereof, and the cylinder 86 is provided with a port 94a at its outer end.

A manually operable controlling valve, generally designated as 95, is connected by means of a pipe 92 to the port 94, and by means of a pipe 93 to the port 94a. The valve 95 comprises a stationary body 120 having axially arranged ports 121 and 122 to which the pipes 92 and 93 are connected, respectively. A rotatable valve member 123 having an operating handle 124 engages a face of the body 120, and this valve member 123 is provided with a stem or axial member 125 extending through the center of the body 120. A valve tensioning spring 126 engages about the stem 125 and is adjusted by means of a tensioning nut 127 which is threaded onto the stem 125.

The valve member 123 is provided with a segmental recess 128, and with a second segmental recess 129 diametrically opposite therefrom. The body 120 is provided with a pair of suction ports 130 and 131 which are adapted to be brought into communication with the ports 121 and 122 through the recesses 128 and 129, respectively.

The intake manifold of the internal combustion engine, designated 99, is connected by means of a pipe 100 to a casing 98 provided with a suction chamber 104 covered by plate 105. This casing 98 is provided with an intake port 132 to which an end of the pipe 96 is connected, and with a second intake port 133 to which the pipe 97 is connected. A lateral chamber 132a is disposed at one side of the chamber 104, and this chamber 132a communicates with the chamber 104 through an opening 112a. A second lateral chamber 133a is disposed at the opposite side of the chamber 104 and communicates with the chamber 104 through an opening 113a. Port 132 communicates with chamber 132a, and port 133 communicates with chamber 133a.

The outer side of chamber 132a is closed by an apertured plate 134 which is threaded into the casing 98, and the outer side of chamber 133a is closed by an apertured plate 117. A rod 109 extends through the openings 112a and 113a, and through the openings in the plates 117 and 134. A valve member 112 is slidable on the rod 109 and is adapted to close the opening 112a upon movement of the rod 109 in one direction, and a valve member 113 is slidable on the rod 109 in the chamber 133a and is adapted to close the opening 113a upon movement of the rod 109 in the opposite direction. A valve member 111 is slidable on the rod 109 and is adapted to engage in the opening of 134 to close this opening upon movement of the rod 109 to the left as shown in Fig. 12. The valve 111 is engaged by a spring 115 which constantly urges this valve outwardly. The valve 111 and spring 115 are adjusted and tensioned by means of tensioning nuts 135.

A valve 114 is slidable on the rod 109 at the other or opposite end, engaging in the opening of the plate 117. The valve 114 has a spring 114a bearing thereagainst, and a nut or nuts 116 are threaded on the rod 109 to tension the valve 114. The valves 111 and 114 are air controlling valves and when in open position admit air to the chambers associated therewith. A rock arm 107 is mounted on a shaft 103 within the suction chamber 104, being secured to the shaft 103 by means of a key or pin 118. Preferably, the arm 107 is forked and the upper ends thereof engage on opposite sides of the rod or slide member 109, being secured thereto by means of a pin 108. A spring 110 has one end thereof secured to a pin 119 within the chamber 104, and the other end of the spring 110 is secured to the rock member 107 and acts to constantly maintain this rock member 107 centrally within the chamber 104. A throttle lever 101 is secured to the shaft 103, and a throttle rod 102 is adapted to be connected to an arm 101a connected with the lever 101. Preferably, the free end of the lever 101 is provided with a toe engaging arm 136 so as to engage above and below the toe of a shoe in order to permit the foot of the operator to forcibly raise and lower the lever 101 with the foot.

The valve casing 98 with the valves therein operates as follows: Assuming that the controlling valve 95 is turned to a forward position, the recess 129 will be in communication with the ports 122 and 131. The recess 128 will also be in communication with the ports 121 and 130. The suction from the manifold 99 will then be communicated from the pipe 100 to the suction chamber 104 and when the throttle lever 101 is depressed, the valve 113 will be opened so that the suction in the chamber 104 will be communicated to the lateral suction chamber 133a and then through the pipe 97 to the port 131 and the recess 129. This suction will then be in communication with the pipe 93 through the port 122, so that the piston 88 will be drawn to the right, as viewed in Figure 12, and the operating lever extension 35b will be pulled to the right, thereby rocking the lever 35 and effecting change in position of the annulus 32. At this time, the valve 112 will be closed so that the suction in the chamber 104 will be cut off from the chamber 132a. The valve 111 will be in open position as shown in Figure 12, so that the chamber 132a will be in communication with the atmosphere and the piston 197 will therefore be in communication with the atmosphere through the pipe 92, recess 128, port 121, and pipe 96.

In the event it is desired to put the transmission in reverse, the valve member 95 is turned to the position where the opening 128 will establish communication between the ports 122 and 130 and between the ports 121 and 131. The rocking of the throttle lever 101 will then permit suction from the chamber 104, chamber 133a, pipe 97, port 31, through the passage 129, port 121, and the pipe 92 which is in communication with the cylinder 85 through the port 94. The cylinder 86 is in communication with the atmosphere through the pipe 93, port 122, passage 128, port 130, pipe 96, and chamber 132a, the valve 111 being at this time in open position, as shown in Figure 12. It will be understood that when valve 95 is set in either reverse or forward position, as above described, reverse torque may be applied by lifting the lever 101 so that valve 111 will be closed and valve 112 will be open. Valve 114 will then be in open position and chamber 133a will be in communication with the atmosphere.

It is obvious that various changes and modifications may be made in the details of construction and design of the above specifically described embodiment of this invention without departing from the spirit thereof, such changes and modifications being restricted only by the scope of the following claims.

What is claimed is:

1. A fluid transmission comprising a casing, a cylinder block in the casing, means connecting one end of the block to a drive shaft, a driven crank in said block connected to a driven member, a series of radially arranged cylinders in said block, pistons in said cylinders connected to said driven crank, a second series of radially arranged cylinders in said block, an annular valve chamber in said block between said first and second series of cylinders, said block having passages connecting each cylinder of each series with said valve chamber, valve means in said valve chamber, pistons in said second series of cylinders, a control lever rockably secured at one end to said casing and having an opening at the opposite end loosely engaging about said driven member, means connecting said latter pistons with said other end of said lever to thereby control the stroke of said latter pistons, and means connecting said valve means with said lever to thereby adjust said valve means coincident with the adjustment of the piston stroke.

2. A fluid transmission comprising a casing, a cylinder block in the casing, means connecting the block to a drive shaft, a driven crank in said block adapted to be connected to a driven member, a series of radially arranged cylinders in said block, pistons in said cylinders connected to said driven crank, a second series of radially arranged cylinders in said block, an annular valve chamber in said block between said first and second series of cylinders, said block having passages connecting each cylinder of each series with said valve chamber, valve means in said valve chamber, pistons in said second series of cylinders, crank means connected to the pistons of said second series of cylinders, a control lever rockably secured at one end to said casing and having an opening at the opposite end loosely engaging about said driven member, means connecting said latter pistons with said other end of said lever to thereby control the stroke of said latter pistons, and means connecting said valve means with said lever to thereby adjust said valve means coincident with the adjustment of the piston stroke.

3. A fluid transmission comprising a casing, a cylinder block in the casing, means connecting the block to a drive shaft, fluid actuated driven means in said block, means connecting said driven means with a driven member, a driving means in said block for said driven means, a control lever rockably secured at one end to said casing and having an opening at the opposite end loosely engaging about said driven member, a tubular member carried by said lever in the opening thereof, and means connecting said tubular member with said driving means.

4. A fluid transmission comprising a casing, a cylinder block in the casing, means connecting the block to a drive shaft, fluid actuated driven means in said block, means connecting said driven means with a driven member, a driving means in said block for said driven means, a control lever rockably secured at one end to said casing and having an opening at the opposite end loosely engaging about said driven member, a tubular member carried by said lever in the opening thereof, and means connecting said tubular member with said driving means.

5. A fluid transmission comprising a casing, a cylinder block in the casing, means connecting the block to a drive shaft, fluid actuated driven means in said block, means connecting said driven means with a driven member, a driving means in said block for said driven means, adjustable valve means interposed between said driven means and said driving means, a control lever rockably secured at one end to said casing and having an opening at the opposite end loosely engaging about said driven member, a tubular member carried by said lever in the opening thereof, means connecting said tubular member with said driving means, and means connecting said valve means with said lever for adjustment therewith.

6. A fluid transmission comprising a casing, a cylinder block in the casing, means connecting the block to a drive shaft, fluid actuated driven means in said block, means connecting said driven means with a driven member, a driving means in said block for said driven means, a pair of valve members interposed between said driven means and said driving means, a pair of cam members connected to said valve members, a control lever rockably secured at one end to said casing and having an opening at the opposite end loosely engaging about said driven member, a tubular member carried by said lever in the opening thereof, means connecting said tubular member with said driving means, and means connecting one of said cam members with said lever for adjustment therewith.

7. A fluid transmission comprising a casing, a cylinder block in the casing, means connecting the block to a drive shaft, fluid actuated driven means in said block, means connecting said driven means with a driven member, a driving means in said block for said driven means, a pair of valve members interposed between said driven means and said driving means, a pair of cam members connected to said valve means, a control lever rockably secured at one end to said casing and having an opening at the opposite end loosely engaging about said driven member, a tubular member carried by said lever in the opening thereof, means connecting said tubular member with said driving means, and link means connecting said lever with one of said cam members for simultaneous operation to thereby control the adjustment of one of said valve members with adjustment of said driving means.

8. A fluid transmission comprising a casing, a cylinder block in the casing, means connecting one end of the block to a drive shaft, a driven crank in said block connected to a driven member, a series of radially arranged cylinders in said block, pistons in said cylinders connected to said driven crank, a second series of radially arranged cylinders in said block, an annular valve chamber in said block between said first and second series of cylinders, said block having passages connecting each cylinder of each series with said valve chamber, valve means in said valve chamber, pistons in said second series of cylinders, a control lever rockably secured at one end to said casing and having an opening at the opposite end loosely engaging about said driven member, means connecting said latter pistons with said other end of said lever to thereby control the stroke of said latter pistons, means connecting said valve means with said lever to thereby adjust said valve means coincident with the adjustment of the piston stroke, said block having a fluid reservoir coaxial therewith and communicating with certain of said cylinders, and check valves opening inwardly of the cylinders communicating with said reservoir whereby the suction formed by reciprocation of said certain pistons will maintain all of said cylinders and fluid passages substantially filled with fluid.

9. A fluid transmission as set forth in claim 8 wherein the casing is provided with means for maintaining said reservoir filled with fluid.

STANLEY S. JOHNS.